United States Patent
Tomczek et al.

(10) Patent No.: US 11,874,959 B2
(45) Date of Patent: Jan. 16, 2024

(54) DYNAMIC NOTIFICATION SURFACING IN VIRTUAL OR AUGMENTED REALITY SCENES

(71) Applicant: Sony Interactive Entertainment Inc., Tokyo (JP)

(72) Inventors: Matthew Tomczek, San Mateo, CA (US); Benjamin Andrew Rottler, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 120 days.

(21) Appl. No.: 17/476,471

(22) Filed: Sep. 15, 2021

(65) Prior Publication Data
US 2023/0080905 A1  Mar. 16, 2023

(51) Int. Cl.
G06F 3/01 (2006.01)
G06F 3/16 (2006.01)
G06T 3/40 (2006.01)

(52) U.S. Cl.
CPC .............. *G06F 3/013* (2013.01); *G06F 3/016* (2013.01); *G06F 3/16* (2013.01); *G06T 3/40* (2013.01)

(58) Field of Classification Search
CPC .......... G06F 3/017; G06F 3/011; G06F 3/013; G06F 3/016; G06F 3/16; G06F 3/167; G02B 27/017; G06T 3/40; G06T 2219/004; G06T 19/00
See application file for complete search history.

(56) References Cited

U.S. PATENT DOCUMENTS

| | | | | |
|---|---|---|---|---|
| 8,565,323 | B1 * | 10/2013 | McCuller | H04N 21/835 |
| | | | | 348/425.2 |
| 10,043,376 | B1 * | 8/2018 | Poornachandran | G08B 31/00 |
| 10,173,141 | B1 * | 1/2019 | Schindler | A63F 13/35 |
| 10,901,215 | B1 * | 1/2021 | Newcombe | G02B 27/0172 |
| 10,928,904 | B1 * | 2/2021 | Novelli | H04N 7/15 |
| 10,948,997 | B1 * | 3/2021 | Victor-Faichney | G06F 3/017 |
| 11,164,380 | B2 * | 11/2021 | McHugh | G06F 3/0481 |
| 11,170,221 | B2 * | 11/2021 | Sato | G06V 20/13 |
| 11,178,376 | B1 * | 11/2021 | Tichenor | G06F 3/017 |
| 11,328,601 | B1 * | 5/2022 | Isaksson | G08B 6/00 |
| 11,409,402 | B1 * | 8/2022 | Cole | G06F 3/04815 |
| 2003/0046401 | A1 * | 3/2003 | Abbott | G06F 9/451 |
| | | | | 709/227 |

(Continued)

OTHER PUBLICATIONS

"International Search Report and Written Opinion", dated Jan. 13, 2023, from the counterpart PCT application PCT/US22/76289.

*Primary Examiner* — William Lu
(74) *Attorney, Agent, or Firm* — John L. Rogitz; John M. Rogitz (57) ABSTRACT

A non-text notification bubble or other graphical object can be presented during an augmented reality, mixed reality, or virtual reality simulation to notify a user that a real-world object is approaching or has crossed a boundary for an interaction space within which the user is to interact with the simulation. Responsive to the system identifying the user as looking at the bubble or other graphical object, the system may then present another notification about the real-world object approaching or crossing the boundary. The real-world object may be an intrusion into the interaction space, such as a human or animal crossing into the space.

20 Claims, 5 Drawing Sheets

(56) References Cited

U.S. PATENT DOCUMENTS

| | | | |
|---|---|---|---|
| 2014/0092099 A1* | 4/2014 | Ashbrook | G06F 3/04842 |
| | | | 345/473 |
| 2015/0097719 A1* | 4/2015 | Balachandreswaran | |
| | | | G01B 11/002 |
| | | | 342/147 |
| 2015/0321606 A1* | 11/2015 | Vartanian | G02B 27/0179 |
| | | | 348/148 |
| 2015/0348591 A1* | 12/2015 | Kaps | G11B 27/17 |
| | | | 386/201 |
| 2016/0048211 A1* | 2/2016 | Raffle | G06F 3/013 |
| | | | 715/863 |
| 2016/0109947 A1* | 4/2016 | George-Svahn | G06F 3/04883 |
| | | | 345/156 |
| 2016/0342327 A1* | 11/2016 | Chi | G06F 3/04883 |
| 2017/0053440 A1* | 2/2017 | Yoon | G06F 3/011 |
| 2017/0185650 A1* | 6/2017 | Vainas | G06F 16/24575 |
| 2017/0287217 A1* | 10/2017 | Kim | B62J 50/22 |
| 2017/0337897 A1* | 11/2017 | Jung | G02B 27/017 |
| 2018/0004286 A1* | 1/2018 | Chen | G06F 3/012 |
| 2018/0095616 A1* | 4/2018 | Valdivia | H04N 7/142 |
| 2018/0150996 A1* | 5/2018 | Gatta | G06F 3/012 |
| 2018/0276969 A1* | 9/2018 | Obaidi | G08G 9/02 |
| 2018/0373412 A1* | 12/2018 | Reif | G06F 3/04815 |
| 2019/0089817 A1* | 3/2019 | Gulbay | G02B 27/017 |
| 2019/0139307 A1* | 5/2019 | Min | A63F 13/53 |
| 2019/0221191 A1* | 7/2019 | Chhipa | G09G 3/002 |
| 2019/0340909 A1* | 11/2019 | Nguyen | B25J 9/1676 |
| 2020/0105011 A1* | 4/2020 | Watabe | G06T 7/73 |
| 2020/0357155 A1* | 11/2020 | Casella | G06T 11/60 |
| 2021/0303107 A1* | 9/2021 | Pla I Conesa | G06F 3/0485 |
| 2022/0187823 A1* | 6/2022 | Ramasamy | G05D 1/0011 |
| 2023/0026638 A1* | 1/2023 | Schoen | G06F 3/011 |

* cited by examiner

DYNAMIC NOTIFICATION SURFACING IN VIRTUAL OR AUGMENTED REALITY SCENES

FIELD

The present application relates generally to graphical objects such as notification bubbles that indicate an intrusion into a real-world interaction space for a virtual simulation.

BACKGROUND

As recognized herein, a computer system may monitor a user during presentation of a virtual reality (VR) simulation to ensure that the user stays within a designated area to safely interact with the simulation without bumping into other real-world objects. But as further recognized herein, safety concerns may also arise when another living thing such as a small child enters the area unbeknownst to the fully-immersed user.

SUMMARY

The present application further recognizes that explicitly and prominently notifying the user of the intrusion, or that the user is about to exit the designated area, can break the user's immersion in the simulation and even negatively affect the simulation itself. For example, if the user's immersion were broken while playing a VR video game, the user may lose to a video game opponent or suffer other consequences within the simulation.

Accordingly, in one aspect a system includes at least one computer medium that is not a transitory signal and that includes instructions executable by at least one processor to identify an intrusion into an interaction space in the real world. The interaction space is designated for use as part of a virtual reality (VR), augmented reality (AR), and/or mixed reality (MR) presentation. The instructions are also executable to present a notification bubble on a display based on the identification of the intrusion, to identify user interaction with the notification bubble, and to present a notification different from the notification bubble based on identification of the user interaction.

In some examples, the instructions may be executable to identify the user interaction with the notification bubble based on identifying the user as looking at the notification bubble for at least a threshold amount of time. Other interactions are also possible, such as air-tapping the bubble to select it.

Additionally, if desired the instructions may be executable to expand the notification bubble as presented on the display based on identifying the user as not interacting with the notification bubble for at least a threshold amount of time from when the notification bubble was presented. Furthermore, in some instances the notification may be a first notification, the threshold amount of time may be a first threshold amount of time, and the instructions may be executable to present a second notification different from the first notification based on identifying the user as not interacting with the notification bubble as expanded for at least a second threshold amount of time. The second notification may include haptic vibration and/or audio.

In various example implementations, the notification bubble may not include text, but the notification itself may include text. The notification may also indicate a current location of the intrusion itself.

Still further, in some example embodiments the notification bubble may be spherical and may be presented in a first color matching at least one background color proximate to the notification bubble.

Also in some example embodiments, the instructions may be executable to identify the intrusion as a living thing and to present the notification bubble on the display based on the identification of the intrusion as a living thing.

The system may include the at least one processor and the display. For example, the system may include a headset that itself includes the at least one processor and the display, with the headset being used to present the VR, AR, and/or MR presentation.

In another aspect, a method includes determining that a real-world object is one or more of coming within a threshold distance of an interaction space boundary and crossing the interaction space boundary. The interaction space boundary establishes at least part of a real-world interaction space within which a user is to be located to interact with virtual content. The method also includes presenting a graphical object on a display on which the virtual content is also presented based on the determining that the real-world object is one or more of coming within the threshold distance and crossing the interaction space boundary. The method then includes identifying user interaction with the graphical object and presenting a notification different from the graphical object based on the identifying the user interaction with the graphical object. The notification indicates the real-world object has one or more of come within the threshold distance and crossed the interaction space boundary.

Thus, in some example implementations the graphical object may include an at least partially transparent notification bubble, and the notification bubble may not include text. The notification bubble may match at least one color of the virtual content and may shimmer and/or sparkle. The real-world object itself may include at least part of the user's body.

Additionally, if desired the virtual content may include a virtual simulation, and the method may include slowing down presentation of the virtual simulation from normal speed playback to slower than normal speed playback responsive to identifying the user as not interacting with the graphical object for at least a first threshold amount of time while the graphical object is presented on the display. Then while the virtual simulation is presented in slower than normal speed playback, the method may include determining that the user has gazed at the graphical object for at least a second threshold amount of time and, based on determining that the user has gazed at the graphical object for at least the second threshold amount of time, using normal speed playback again for presentation of the virtual simulation.

In still another aspect, a system includes at least one computer medium that is not a transitory signal and that includes instructions executable by at least one processor to present a non-text graphical object on a display on which other content is also presented. The instructions are also executable to identify, via eye tracking, user interaction with the non-text graphical object. The instructions are then executable to, based on the identification of the user interaction with the non-text graphical object, present a notification different from the non-text graphical object.

Further, in one example the instructions may be executable to present audio associated with the non-text graphical object while presenting the non-text graphical object on the display. In these examples, the instructions may then be executable to determine, based on eye tracking, that a user's gaze is approaching a display location at which the non-text graphical object is presented. Based on the determination that the user's gaze is approaching the display location, the instructions may then be executable to progressively lower the volume at which the audio is presented as the user's gaze continues to approach the non-text graphical object.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
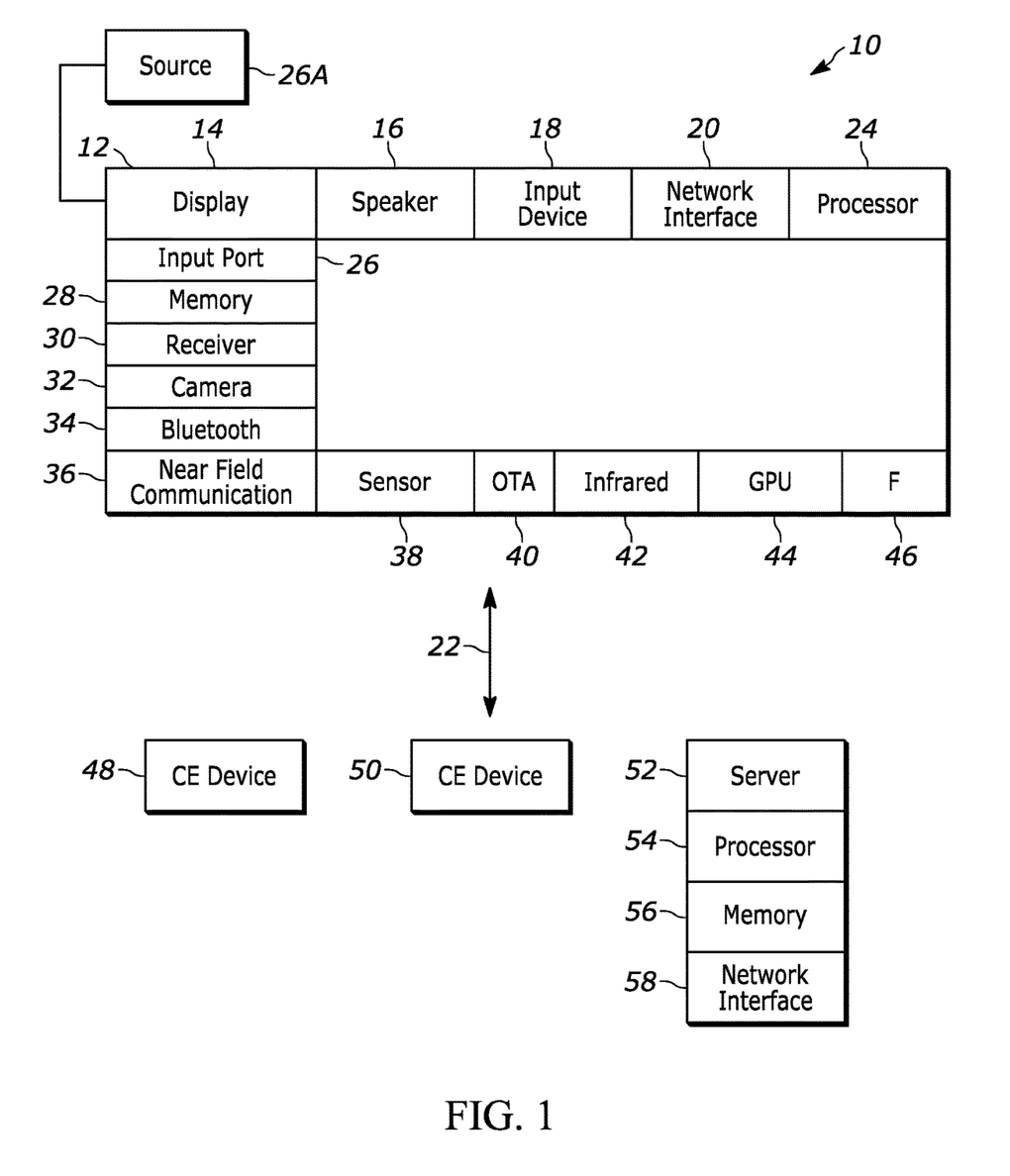
FIG. 1 is a block diagram of an example system in accordance with present principles.

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated and/or expanded, and UI elements may be mixed and matched between UIs.

Figure 2:
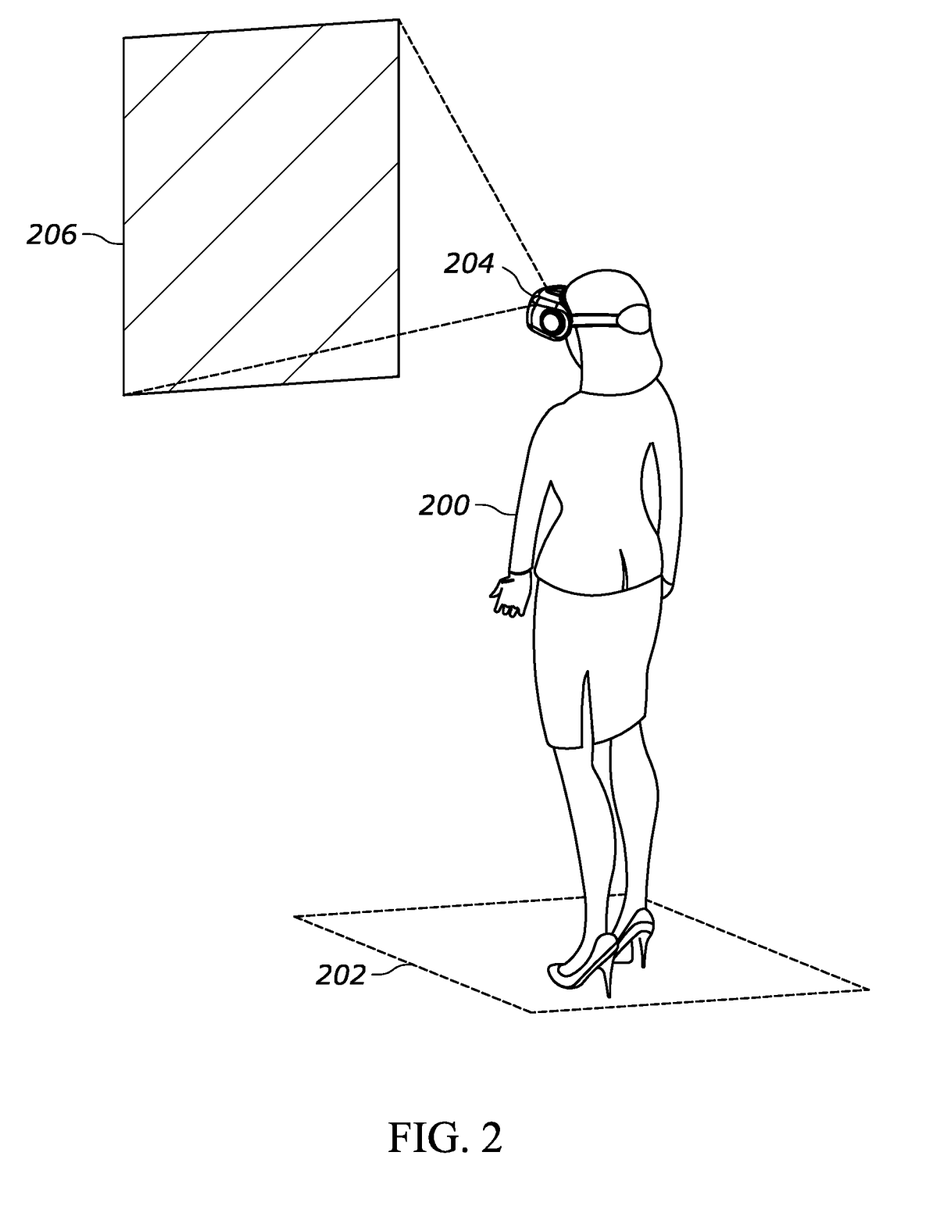
FIG. 2 illustrates a user standing within an interaction area while interacting with a virtual simulation consistent with present principles.

Referring now to FIG. 2, suppose an end-user 200 is standing within a real-world interaction area 202 in his/her personal residence. The interaction area 202 may have been previously defined by the user during a setup process for a virtual simulation, such as a VR video game that is being viewed/played by the user 200 using a VR headset 204. As shown, the area 202 may have various boundaries to establish a box on the floor of the residence. Further note that the area 202 may have additional boundaries to establish a three-dimensional volume for the area 202 that is defined in part by a height dimension at least matching the user's height. Thus, the area 202 may have boundaries in all three dimensions. The user 200 may remain within the box while immersed in the virtual simulation to be able to interact with the simulation safely without striking other real-world objects the user 200 would not be able to see while immersed with the virtual content.

As also shown in FIG. 2, a virtual field of view (FOV) 206 indicates the user's field of view within the simulation as the simulation is presented on the display of the headset 204.

Figure 3:
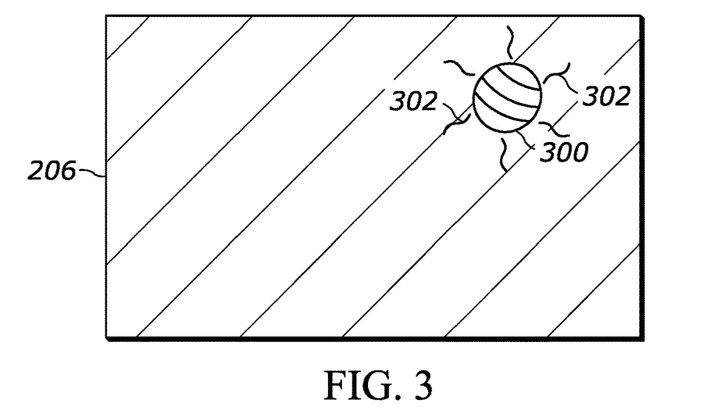
FIGS. 3 and 4 show an example notification bubble that may be presented as part of a virtual simulation consistent with present principles.

Now suppose the user 200 comes within a threshold distance to one of the boundaries of the area 202 from inside the area 202, that the user 200 has at least part of their body cross one of the boundaries from inside the area 202 to outside the area 202, and/or that another living object such as a dog or child crosses at least partially into the area 202 through one of the boundaries. FIG. 3 illustrates that a spherical notification bubble 300 or other graphical object may be presented in the virtual FOV 206 as part of the simulation in order to draw the user's attention to the bubble 300 without completely breaking the user's immersion in the simulation.

To this end, the bubble 300 may be semi-transparent or fully-transparent so that the user 200 can still see other virtual content presented as part of the simulation that might be represented as existing in front of or behind the bubble 300 according to the simulation. If presented semi-transparently (or even if presented opaquely), to further allow the user 200 to remain immersed, the bubble 300 may be presented in one or more colors that match one or more respective background colors of the simulation or that match one or more colors of other virtual objects presented as part of the simulation.

In some examples, the bubble 300 may also shimmer and/or sparkle according to virtual light presented as part of the simulation to draw the user's attention while still not fully breaking the user's immersion, as illustrated by squiggly lines 302 emanating from the bubble 300. Additionally, or alternatively, the contours of the bubble 300 may be presented as reflecting virtual light.

To also allow the user to remain as immersed as possible in the virtual world represented by the simulation, the bubble may not include any text warning about the intrusion or boundary crossing/potential boundary crossing. But to still help warn the user, a location of the intrusion or location of the relevant boundary itself may be indicated via the location within the virtual FOV 206 of the bubble 300 itself. In the present example, the location of the bubble 300 indicates that the intrusion or relevant boundary is in front of the user 202 and slightly to the right.

However, note that in other examples the bubble 300 need not necessarily indicate the current location of the relevant intrusion or boundary with respect to the user but might instead be presented in a predetermined, static location within the FOV 206, such as an upper right corner of the FOV 206. But in either case, note that should the user 200 fail to interact with the bubble 300 within a threshold amount of time, the bubble 300 may be expanded or enlarged to have a larger radius compared to its initial presentation shown in FIG. 3.

Figure 4:
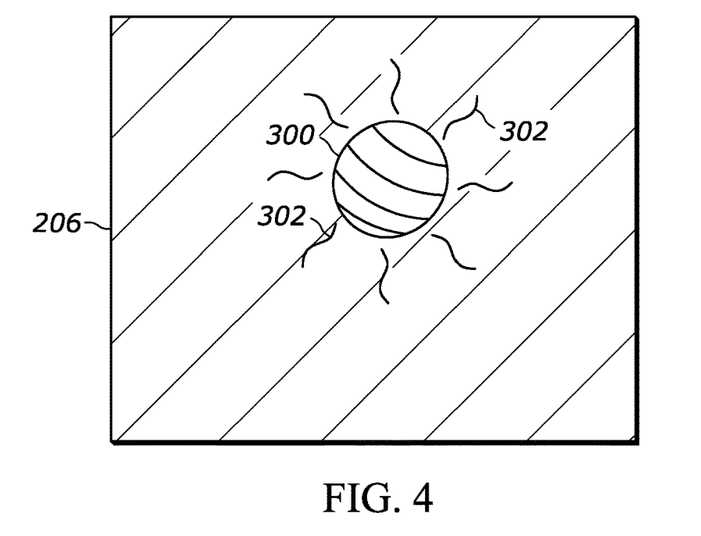

FIG. 4 thus shows the expanded bubble 300. As may also be appreciated from FIG. 4, the bubble 300 is presented more central in the user's FOV 206 as well. Specifically, the bubble 300 may be presented more central to the user's FOV 206 in both X and Y dimensions, and sometimes may also be presented at a new, closer depth in the Z dimension to appear closer to the user's virtual world location as well.

Furthermore, in some examples the simulation system/headset 204 may use audio to draw the user's attention to the bubble 300 either in initial form per FIG. 3 or expanded form per FIG. 4. But to facilitate user immersion in the simulation, the audio may be audio from or associated with the simulation itself, such as a specific tone or chime presented at other times as part of the simulation. But in other instances, another sound not associated with the simulation may be used to draw the user's attention more-quickly to the bubble 300.

In any case, note that in example embodiments the audio may be presented via one or more speakers (e.g., headphones the user 200 is already wearing to present audio from the simulation) and act as an audio beacon to draw the user's attention to the bubble 300 (whether presented in initial or expanded form). The headset 204 may then execute eye tracking using images of the user's eyes from one or more inward-facing cameras on the headset 204 to track the user's eye movements possibly toward viewing the bubble 300 at its display location. As the user's gaze approaches the display location, headset 204 may progressively lower the volume level at which the audio is presented from an initial volume level to incrementally lower volume levels as the user's gaze continues to approach the bubble 300. In doing so, the headset 204 may cue the user that the user is getting closer and closer to viewing the bubble 300, further incentivizing the user to do so for safety while at the same time maintaining immersion in other parts of the simulation by lowering the volume level itself.

Figure 5:
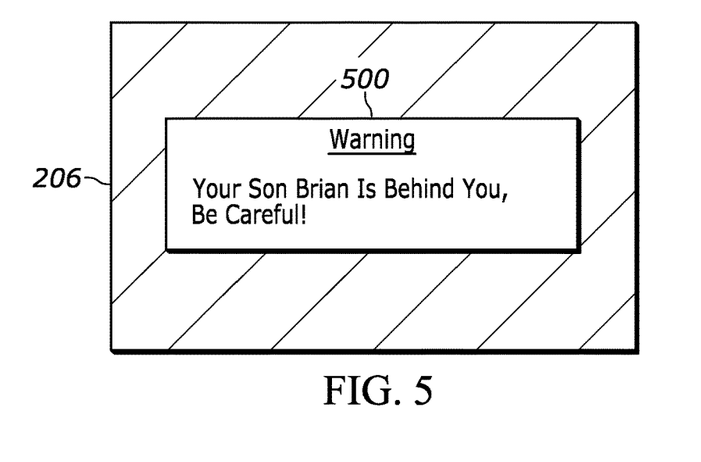
FIG. 5 shows an example text notification that may be presented on a display based on the user looking at the notification bubble consistent with present principles.

Then once the user 200 stares/gazes continually at the bubble 300 for a threshold amount of time, whether in its initially-presented size/volume per FIG. 3 or its expanded size/volume per FIG. 4, another notification 500 different from the bubble 300 may be presented to the user as illustrated in FIG. 5. As shown in FIG. 5, the notification 500 may include text indicating a name of a particular person identified as entering the area 202, as may have been identified by the user's headset or a connected device using facial recognition and a camera on or in communication with the headset. Other methods of identifying the name and other characteristics of the intrusion/intruder may also be used (e.g., object recognition to identify a dog or cat). As may also be appreciated from FIG. 5, the notification 500 indicates not just the identity of the living thing intruding the area 202, but also the relationship to the user 200 (the user's son in this example) and a location of the intrusion relative to the real-world location of the user (behind the user per this example).

Further note that in examples where a living intrusion is not detected as entering the area 202 but instead the user 200 intentionally or unintentionally exits the area 202 or partially exits the area 202 (e.g., while playing a VR video game establishing the simulation), the notification 500 may be different. For example, in this situation the notification might instead indicate that a boundary has been crossed or that the user is within a threshold non-zero distance of the boundary itself, such as two inches. The notification might also indicate which particular boundary is the subject of the notification and its location relative to the user 200.

Moreover, note that still other types of notifications may be visually presented per FIG. 5 based on the user interacting with the bubble 300 in initial or expanded size. This may occur regardless of whether the bubble 300 is presented based on an intrusion, based on the user exiting the area 202/crossing one of its boundaries, or based another notification criterion such as a software trigger to present a notification.

Thus, it is to be more generally understood that a non-text graphical object as described herein may be presented in other instances besides interaction area intrusions and boundary crossings. Correspondingly, user interaction with non-text graphical objects in such instances may trigger presentation of corresponding notifications, alerts, and GUIs of various other types than those described above.

For example, the system may present non-text graphical objects and corresponding notifications regarding system or console health, video game controller battery levels, supplemental information, other status updates, presence updates, achievements, environmental changes (e.g., real-world ambient lighting changes or room temperature changes), game world changes, the addition of game capabilities or game character capabilities, etc. As another example, the system may present a non-text graphical object and then corresponding GUI with audio controls/selectors for changing audio aspects of the simulation (such as volume level, equalization parameters, etc.). Bubbles and other non-text graphical objects may therefore be presented at the user's "edge of vision" (even if no intrusion or boundary crossing is detected), waiting for the user to pay attention and provide focus to thus trigger the system to respond by presenting, growing, focusing, or expanding the notification(s).

Figure 6:
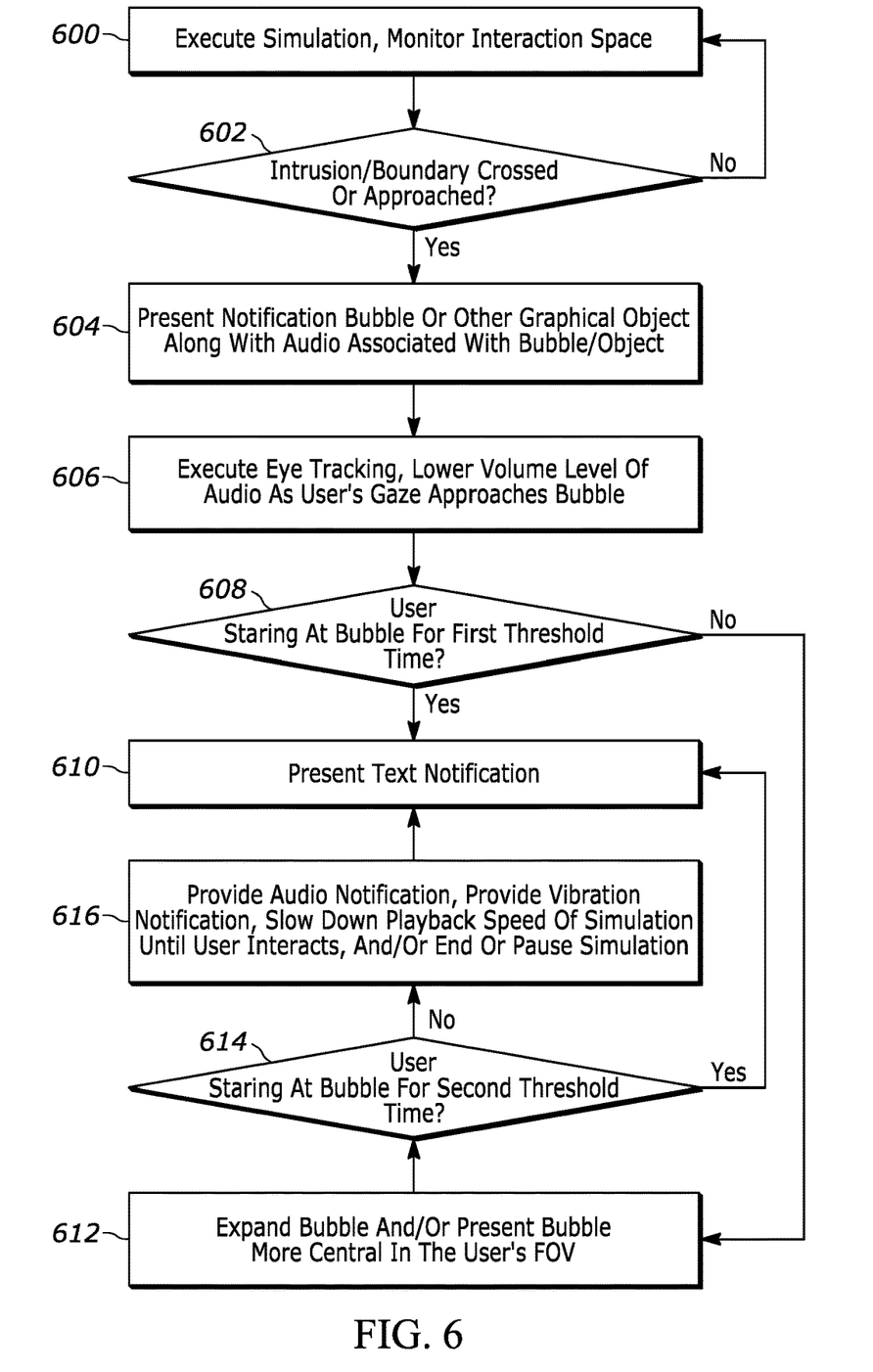
FIG. 6 illustrates example logic in example flow chart format consistent with present principles.

Reference is now made to FIG. 6, which shows a flow chart illustrating example logic that may be executed by a headset and/or connected device such as a server and/or computer game console consistent with present principles. Beginning at block 600, the device may execute and present a virtual simulation such as a virtual reality (VR) presentation, augmented reality (AR) presentation, and/or mixed reality (MR) presentation.

Also at block 600, the device may monitor the user's interaction space (e.g., the area 202) and location of the user himself or herself. The monitoring may be performed using images from one or more cameras on the headset or elsewhere in the user's environment along with image processing techniques such as computer vision, image registration, spatial mapping, object recognition, facial recognition, etc.

From block 600 the logic may then proceed to decision diamond 602 where the device may determine whether an intrusion has been detected as coming within the interaction space, and/or whether a boundary has been crossed inward by another object or outward by the user himself/herself. In some examples, the decision at diamond 602 may also involve determining whether the user has not actually crossed a boundary yet but is within a threshold distance of doing so as described above.

A negative determination at diamond 602 may cause the logic to revert back to block 600 and proceed again therefrom. However, an affirmative determination at diamond 602 may cause the logic to instead proceed to block 604. At block 604 the device may present a notification bubble or other graphical object to the user as described above, also possibly while presenting audio associated with the bubble/object as also described above.

Thereafter, the logic may proceed to block 606 where the device may execute eye tracking to track the user's gaze while the bubble/object is presented, and possibly lower the volume level of the audio associated with the bubble as described above if the user's gaze is determined to be approaching the display location of the bubble. From block 606 the logic may then proceed to decision diamond 608.

At diamond 608 the device may determine whether the user has been staring at the bubble for at least a first threshold amount of time or has otherwise interacted with the bubble such as by air tapping it where it appears to exist within the simulation. An affirmative determination at diamond 608 may cause the logic to proceed to block 610 where a text-based notification such as the notification 500 may be presented to the user. In some examples, the text-based notification may be presented for a predetermined amount of time such as five seconds, until the user is determined to have read it from top to bottom, until the intrusion no longer exists within the interaction space, or until the user is sufficiently within the bounds of the interaction space again.

However, in other examples the user may need to affirmatively dismiss the text notification itself by swiping away the notification offscreen using his/her hand from where it appears to be presented within the simulation (e.g., as recognized via gesture recognition using images from the headset's forward-facing camera). Other actions besides swiping may also be taken to dismiss the notification, such as providing a voice command to dismiss it. But regardless of the specific action that is taken, needing to provide such an action may help to ensure that the text-based notification itself has been acknowledged and/or absorbed. Thereafter, the logic may revert back to block 600 and proceed therefrom.

However, if a negative determination is made at diamond 608 instead, the logic may instead proceed to block 612. At block 612 the device may expand the size/volume of the bubble or other 3D graphical object as described above in reference to FIG. 4. Additionally, or alternatively, at block 612 the device may present the bubble/object more central within the user's field of view in X and Y dimensions, and possibly also present the bubble/object to appear at a closer depth to the user within the simulation itself. The logic may then proceed to decision diamond 614.

At diamond 614 the device may determine whether the user has been staring at the bubble/object as expanded for at least a second threshold amount of time (or has otherwise interacted with the expanded bubble). The second threshold amount of time may be the same as the first threshold amount of time or may be different. For example, the second threshold amount of time may be shorter than the first threshold amount of time since safety may be of increased essence at that point and the system might need to take additional action absent user interaction. But regardless, note that both of the first and second threshold amounts of time may be in excess of one hundred fifty or even two hundred milliseconds so that the device does not confuse saccades with intentional looking at the bubble/object (e.g., since a saccade can generally last one hundred fifty or even two hundred milliseconds).

An affirmative determination at diamond 614 may cause the logic to proceed to block 610 where a text-based notification such as the notification 500 may be presented to the user. Thereafter, the text-based notification may be dismissed, and the logic may revert back to block 600 and proceed therefrom.

However, a negative determination at diamond 614 may instead cause the logic to proceed to block 616 where the device may present another notification of another type, such as a haptic vibration at the headset of a particular amplitude, frequency, and/or pattern. The other notification may also include predetermined audio such as a certain chime or tone that is presented at the headset. The logic may then proceed from block 616 to block 610. Thus, the additional notification(s) can more-prominently cue the user to a potential safety hazard or other intrusion, and furthermore they may persist until the user looks at the text-based notification itself as described above.

Additionally, or alternatively but also at block 616, the device may slow down presentation of the simulation itself from normal/real-time speed playback to slower than normal speed playback to still maintain some level of user immersion. For example, the simulation may be presented in slow-motion, where normal speed frames-per-second (fps) for playback is 60 fps and slow-motion playback of the simulation occurs at 30 fps. Then responsive to determining that the user has gazed at the bubble/object for the second threshold amount of time, the device may again begin using normal speed playback for presentation of the simulation and/or proceed to block 610 for presentation of the text-based notification.

Also, at block 616 but instead of slowing down presentation of the simulation, in some example implementations the device may stop, end, and/or pause presentation of the simulation. In such an instance, the simulation's visual presentation may be removed from the headset's display completely so the user can see the real-world through the transparent display or via a camera feed presented on a non-transparent display. Alternatively, the visual presentation may simply remain presented and paused in full color and opacity. Or in still other instances, outlines and contours of virtual items being presented as part of the simulation may still be presented but other inner parts of the items themselves may be made transparent for the user to see the real-world through the outlines while still maintaining some level of immersion. Then responsive to determining that the user has gazed at the bubble/object for the second threshold amount of time, the device may un-pause or otherwise again begin presenting the simulation at normal speed playback, and/or the logic may proceed to block 610 for presentation of the text-based notification.

Furthermore, note for completeness that if any point during the execution of steps 602-616 the device determines that the intrusion no longer exists or the user is sufficiently disposed within the designated interaction space, the device may remove the bubble/graphical object from presentation on the headset's display and simply go on presenting the simulation.

Figure 7:
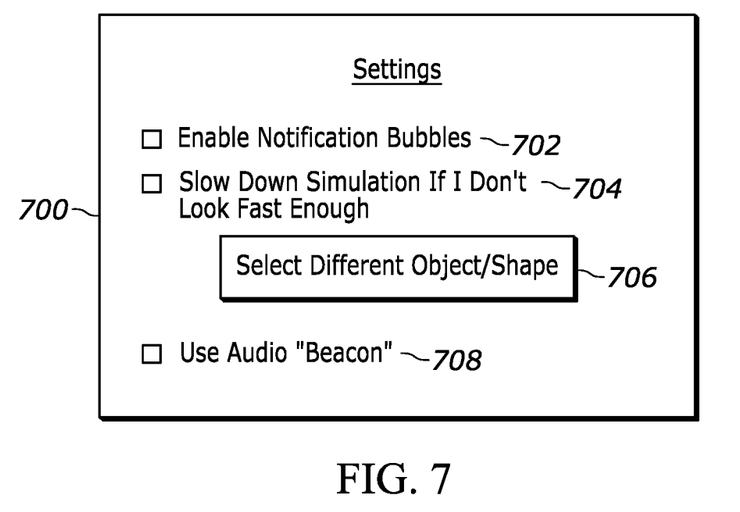
FIG. 7 shows an example graphical user interface (GUI) that may be presented to configure one or more settings of a system/device to operate consistent with present principles.

Before moving on to the description of FIG. 7, note with respect to the threshold times and threshold distances described herein that they may be established by a system administrator, simulation developer, and/or device manufacturer as appropriate. In some examples, the user may also be given the option to establish the threshold times and distances, such as via a graphical user interface (GUI) like the one that will now be described.

Accordingly, reference is now made to FIG. 7, which shows an example GUI 700 that may be presented on the display of a headset or connected device to configure one or more settings of bubble notification presentation consistent with present principles. In the example shown, each option on the GUI 700 may be selected by directing touch or cursor input to the respective check box adjacent to the respective option.

As shown in FIG. 7, the GUI 700 may include a first option 702 that may be selectable a single time to enable the headset or other device to, for multiple future instances of virtual simulation presentation, execute the functions described above in reference to FIGS. 2-5 and execute the logic of FIG. 6.

The GUI 700 may also include an option 704 that may be selectable to set or enable the device to slow down the playback speed of a simulation that is being presented if the user does not look at the bubble/object for a threshold amount of time as described above. Other options may be presented as well, such as an option to end or pause presentation of the simulation instead as also described above.

Still further, in certain examples the GUI 700 may include a selector 706 that may be selectable to present another GUI from which another graphical object besides a notification bubble may be selected for use in place of the notification bubble itself consistent with present principles. For example, the user might select the selector 706 to subsequently select a semi-transparent cube or cone to use as the graphical object, or to even select a graphical object themed to a particular simulation itself for greater user immersion (e.g., the avatar of a main virtual character from the simulation). The user might also select other types of graphical objects to use consistent with present principles, such as selecting a background shimmer, sparkle, or warping visual to use in the background and/or foreground of the simulation (e.g., where the sphere 300 would otherwise be presented itself). Various icons available to the system might also be selected to use as the graphical object, such as an icon associated with the simulation, or an icon associated with a manufacturer of the headset or connected device.

Additionally, the GUI 700 may include an option 708 to specifically set or enable the device to use an audio beacon as also described above while presenting an associated bubble or other graphical object to further cue the user to gaze at the bubble/object itself. Further still, though not shown for clarity, respective input boxes to establish the time and distance thresholds described above may also be presented for the end-user to establish the thresholds per his/her preference.

Figure 8:
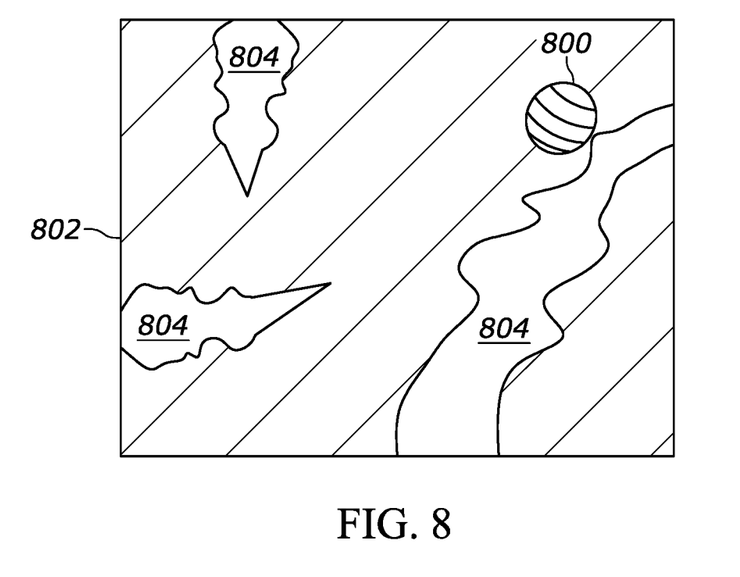
FIG. 8 shows an example combination of a notification bubble and virtual simulation alteration that may be used consistent with present principles.

Continuing the detailed description in reference to FIG. 8, it shows another example of how a given virtual simulation might be altered to indicate an intrusion or boundary crossing/potential boundary crossing to a user. As shown, a spherical notification bubble 800 is again presented within a virtual FOV 802 the user sees via the headset display to view the simulation itself. However, in addition to or in lieu of expanding the bubble 800 based on the user not looking at the bubble 800 within a threshold amount of time from when it was presented, the virtual world of the simulation itself may be made to appear to warp or crack so that portions of the real world may be seen through cracks 804 that essentially act as windows into the real-world either through a transparent display of the headset or using a camera feed from the headset of the user's external real-world environment. Thus, immersion in the virtual world may not be fully broken but the user may be made immediately aware of a potential safety hazard.

Moving on from FIG. 8, note consistent with present principles that a notification bubble or other non-text graphical object as disclosed herein may be presented larger and more centrally-located within a user's field of view as a risk or threat increases. Corresponding audio may also be presented louder and louder as a risk or threat increases (and/or the tone/audio itself may change), and in some examples presentation of the audio may precede the visual notification bubble itself. For example, an artificial intelligence (AI) model having one or more neural networks may be used to infer that a risk or threat is increasing. E.g., the AI model may be used to infer that the user's current movement/trajectory demonstrates that the user will cross outside of a designated interaction area and thus the device may increase the size of the bubble as the user gets closer and closer to an associated boundary. Additionally, if a human or other living thing enters the interaction area and its trajectory demonstrates that it will continue getting closer to the user, the AI model may infer as much to cause the device to increase the size of the bubble. Thus, the speed at which the bubble expands and/or is presented more centrally may be dynamic and depend on the rate at which the corresponding level of risk/threat increases.

Accordingly, present principles may employ machine learning models, including deep learning models, for training the neural network(s) of such an AI model for the purposes described above. Machine learning models may use various algorithms trained in ways that include supervised learning, unsupervised learning, semi-supervised learning, reinforcement learning, feature learning, self-learning, and other forms of learning. Examples of neural networks that may be used, which can be implemented by computer circuitry, include a recurrent neural network (RNN) which may be appropriate to learn information from a series of images (e.g., showing the user's trajectory), and a type of RNN known as a long short-term memory (LSTM) network. As understood herein, performing machine learning involves accessing and then training a model on training data to enable the model to process further data to make predictions/inferences. A neural network itself may thus include an input layer, an output layer, and multiple hidden layers in between that that are trained and weighted to make inferences about an appropriate output.

Also note that an electronic tool set may be created by a headset or console manufacturer, where the tool set may include a default or native graphical object that is to be used (e.g., the spherical notification bubble described above) but that also allows third party simulation creators and developers to designate other graphical objects specific to their simulations to use instead of the default graphical object. The tool set may also allow the third parties to designate simulation-specific audio to use according to the description above.

Still further, note consistent with present principles that in lieu of presenting a notification bubble or other graphical object more centrally within the user's FOV under certain circumstances, in other examples the bubble/object may be presented more in line with the user's gaze itself, wherever that may be. E.g., a predictive gaze-map/heatmap of previous gaze locations and tendencies may be used to predict a future gaze location or to select a most-frequent gaze location. The bubble/object may then be presented at that location. The bubble/object may then remain at that location, so it does not jump around with future gaze shifting.

While the particular embodiments are herein shown and described in detail, it is to be understood that the subject matter which is encompassed by the present invention is limited only by the claims.

What is claimed is:

1. A system comprising:
   at least one computer medium that is not a transitory signal and that comprises instructions executable by at least one processor to:
   identify an intrusion into an interaction space in the real world, the interaction space designated for use as part of a virtual reality (VR), augmented reality (AR), and/or mixed reality (MR) presentation;
   based on the identification of the intrusion, present a notification bubble on a display;
   identify the intrusion as getting closer to a user;
   based on identifying the intrusion as getting closer to the user, move the notification bubble from a first location to a second location, the second location being more centrally-located within the user's field of view than the first location;
   identify user interaction with the notification bubble; and
   based on identification of the user interaction, present a notification different from the notification bubble;
   wherein the notification bubble is spherical and presented in a first color matching at least one background color proximate to the notification bubble.

2. The system of claim 1, wherein the instructions are executable to:
   identify the user interaction with the notification bubble based on identifying the user as looking at the notification bubble for at least a threshold amount of time.

3. The system of claim 1, wherein the instructions are executable to:
   based on identifying the user as not interacting with the notification bubble for at least a threshold amount of time from when the notification bubble was presented, expand the notification bubble as presented on the display.

4. The system of claim 3, wherein the notification is a first notification, wherein the threshold amount of time is a first threshold amount of time, and wherein the instructions are executable to:
   based on identifying the user as not interacting with the notification bubble as expanded for at least a second threshold amount of time, present a second notification different from the first notification, the second notification comprising haptic vibration and/or audio, the second threshold amount of time not running concurrently with the first threshold amount of time.

5. The system of claim 1, wherein the instructions are executable to:
   identify the intrusion as a living thing; and
   based on the identification of the intrusion as a living thing, present the notification bubble on the display.

6. The system of claim 1, comprising the at least one processor.

7. The system of claim 6, comprising the display.

8. The system of claim 1, comprising a headset, the headset comprising the at least one processor and the display, the headset being used to present the VR, AR, and/or MR presentation.

9. The system of claim 1, wherein the instructions are executable to:
   based on identifying the user as not interacting with the notification bubble for at least a threshold amount of time, present the notification bubble to appear closer to the user in the Z dimension.

10. The system of claim 1, wherein the instructions are executable to:
    based on identifying the user as failing to interact with the notification bubble for at least a threshold amount of time from when the notification bubble was initially presented in a first instance, expand the notification bubble as presented on the display.

11. The system of claim 1, wherein the instructions are executable to:
    based on identifying the intrusion as getting closer to the user, present audio louder than prior to the intrusion getting closer.

12. The system of claim 1, wherein the notification comprises text, and wherein the instructions are executable to:
    determine that the user has read the text from top to bottom; and
    based on the determination that the user has read the text from top to bottom, dismiss the notification.

13. A method, comprising:
    determining that a real-world object is one or more of coming within a threshold distance of an interaction space boundary and crossing the interaction space boundary, wherein the interaction space boundary establishes at least part of a real-world interaction space within which a user is to be located to interact with virtual content;

based on the determining that the real-world object is one or more of coming within the threshold distance and crossing the interaction space boundary, presenting a graphical object on a display on which the virtual content is also presented;

based on identifying the user as not interacting with the graphical object for at least a threshold amount of time, presenting the graphical object to appear closer to the user in the Z dimension;

identifying user interaction with the graphical object; and based on the identifying of the user interaction with the graphical object, presenting a notification different from the graphical object, the notification indicating the real-world object has one or more of come within the threshold distance and crossed the interaction space boundary.

14. The method of claim 13, wherein the graphical object shimmers and/or sparkles.

15. The method of claim 13, wherein the real-world object comprises at least part of the user's body.

16. The method of claim 13, wherein the threshold amount of time is a first threshold amount of time, and wherein the method comprises:

while the virtual simulation is presented in slower than normal speed playback, determining that the user has gazed at the graphical object for at least a second threshold amount of time; and based on determining that the user has gazed at the graphical object for at least the second threshold amount of time, using normal speed playback for presentation of the virtual simulation.

17. The method of claim 13, wherein the graphical object is presented as reflecting virtual light.

18. A system comprising:

at least one computer medium that is not a transitory signal and that comprises instructions executable by at least one processor to:

present a non-text graphical object on a display on which other content is also presented, the non-text graphical object being presented in at least a first color;

based on identifying a user as not interacting with the non-text graphical object for at least a threshold amount of time, present the non-text graphical object on the display to appear closer to the user in the Z dimension;

identify, via eye tracking, user interaction with the non-text graphical object; and based on the identification of the user interaction with the non-text graphical object, present a notification different from the non-text graphical object.

19. The system of claim 18, wherein the instructions are executable to:

predict a future gaze location of the user; and based on the prediction, present the non-text graphical object at the future gaze location.

20. The system of claim 18, comprising the at least one processor.

* * * * *